(12) United States Patent
Waclawski

(10) Patent No.: US 6,377,907 B1
(45) Date of Patent: Apr. 23, 2002

(54) SYSTEM AND METHOD FOR COLLATING UNIX PERFORMANCE METRICS

(75) Inventor: Anthony C. Waclawski, Colo. Spgs., CO (US)

(73) Assignee: MCI WorldCom, Inc., Jackson, MS (US)

( * ) Notice: Subject to any disclaimer, the term of this patent is extended or adjusted under 35 U.S.C. 154(b) by 0 days.

(21) Appl. No.: 09/441,600

(22) Filed: Nov. 17, 1999

(51) Int. Cl.[7] .................... G06F 11/34; G06F 11/00
(52) U.S. Cl. ............... 702/182; 702/183; 702/184; 702/179; 702/186; 702/196; 709/104; 709/226; 703/2
(58) Field of Search ................. 702/182, 183, 702/184; 709/104, 226; 703/2

(56) References Cited

U.S. PATENT DOCUMENTS 5,339,445 A * 8/1994 Gasztonyi .................. 395/750
5,761,091 A * 6/1998 Agrawal et al. ........ 364/551.01
6,086,618 A * 7/2000 Al-Hilali et al. ................ 703/2
6,182,022 B1 * 1/2001 Mayle et al. ................ 702/182

* cited by examiner

Primary Examiner—Marc S. Hoff
Assistant Examiner—Paul Kim

(57) ABSTRACT

A system and method for selecting forecasting performance metrics from among a plurality of performance metrics includes a data mining kernel that receives performance metrics from a collection agent. The data mining kernel performs a factor analysis on the performance metrics to identify one or more factors and associates each performance metric with a corresponding one of the one or more factors. For each of the one or more factors, the data mining kernel selects the performance metrics having a weight greater than a predetermined value thus pairing the selected performance metrics down to the forecasting performance metrics. The forecasting performance metrics are then stored in a database for access by a capacity planning system.

20 Claims, 8 Drawing Sheets

| Patrol Parameter | ITSV Variable Name | Description |
|---|---|---|
| ACTPRCPUPerc | ACTPCPUP | % of CPU use for the selected active process |
| ACTPRCPUTime | ACTPCCTM | Accumulated CPU time for the selected active process |
| ACTPRDeltaCPU | ACTPRDCP | Change in CPU time since the last collection |
| ACTPRMem | ACTPMMEM | Amount of memory the selected active process is consuming |
| ACTPRMemWait | ACTPMEMW | Warns if the active process is waiting for memory |
| ACTPRRank | ACTPRRNK | Rank of active processes |
| CPUCpuUtil | CPUTIL | Percent CPU utilization |
| CPUIdleTime | CPIDLETM | Percent of time CPU was idle |
| CPUInt | CPUINT | # of non-VME device interrupts |
| CPULoad | CPULOAD | 1-minute load average from the uptime command |
| CPUProcSwch | CPUPSWCH | Total # of CPU context switches per second |
| CPURunQSize | CPRUNQSZ | Average # of processes in the run |
| CPUSysTime | CPSYSTM | Percent of CPU time spent in system mode |
| CPUUserTime | CPUSERTM | Percent of CPU time spent in user mode |
| CPUWSwp | CPUWSWP | % of time the CPU spends waiting for swap I/O operations |
| CPUWio | CPUWIO | % of time that the CPU spends waiting for I/O operations |
| DSKAvgQueue | DSKAVGQ | Average # of disk I/O requests in the |
| DSKAvgServ | DSKAVGST | Average service time (ms), in which transfer requests are completed |
| DSKAvgWait | DSKAVGWT | Average time transfer requests wait in queue |
| DSKBps | DSKBPS | # of 1-KB blocks read from or written to the device per second |
| DSKMsps | DSKMSPS | Average disk seek time for the device |
| DSKPercentBusy | DSKPCBSY | Percent of time a the device is busy |
| DSKRead | DSKREAD | # of disk read requests per second |
| DSKReadWrite | DSKRDWRT | # of read and write requests made to the device per second |
| DSKSps | DSKSPS | # of disk seeks per second |
| DSKTps | DSKTPS | # of disk transfers performed per second |
| DSKWrite | DSKWRITE | # of KBs written to disk per second |
| FSCapacity | FSCAPCTY | Percent of file system storage currently in |
| FSFreeInodes | FSFINODE | # of unused I-nodes on the local file system |
| FSInodeUsedPercent | FSINPCTU | Percent of I-nodes used |
| KERDirBlk | KERDIRBK | # of directory blocks read per second |
| KERFileUsedPercent | KERFLUPC | The % of Kernel file slots in use |
| KERGNodeUsedPercent | KERGNUSD | % of the kernel G-node slots being used |
| KERIGet | KERIGET | # of files locate by an I-Node entry |
| KERINodeUsedPercent | KERINUPC | % of kernel I-node slots being used |
| KERLgAlloc | KERLGALC | Memory in bytes allocated for large memory requests by KMA |
| KERLgFail | KERLGFAL | # of large memory pool requests that were not satisfied |
| KERLgMem | KERLGMEM | Amount of memory in bytes available in the KMA |
| KERLockUsedPercent | KERLUPCT | % of the kernel lock slots being used |
| KERMsg | KERMSG | # of message operations per second |
| KERNamei | KERNAMEI | # of file system pathname searches being performed |
| KEROvzAlloc | KEROVALC | Amount of memory dynamically allocated for oversized requests |

FIG. 2A

| Patrol Parameter | ITSV Variable Name | Description |
|---|---|---|
| KEROvzFail | KEROVFAL | # of requests for oversized memory that could not be satisfied |
| KERProcUsedPercent | KERPUPCT | % of Kernel process slots used |
| KERSemOps | KERSEMOP | # of semephore operations per second |
| KERSmlAlloc | KERSMALC | Memory in bytes allocated to the small memory request pool |
| KERSmlFail | KERSMFAL | # of small memory requests that failed |
| KERSmlMem | KERSMMEM | Memory (in bytes) available in the small memory request pool |
| KERSysCall | KERSYSCL | Total # of system calls per second |
| LOGFileSize | LOGFLSIZ | Size of the file being monitored |
| MEMActiveVirPage | MEMACVPG | # of active virtual pages |
| MEMAddrTransFault | MEMADTRF | # of pages that were not in physical memory when accessed |
| MEMAllocD | MEMALOCD | Amount of memory allocated to heap memory |
| MEMBFree | MEMBFREE | Amount, in bytes, of heap memory freed per second |
| MEMBRead | MEMBREAD | # of physical reads per sec from the disk to the buffer cache |
| MEMBReq | MEMBREQ | Amount of memory requested per second by the heap |
| MEMBWrt | MEMBWRIT | # of physical writes per sec to disk from the system buffer cache |
| MEMBlkPerReq | MEMBPREQ | # of memory blocks searched per request |
| MEMCache | MEMCACHE | # of page faults corrected by bringing pages in from the page cache |
| MEMCow | MEMCOW | # of Copy On Write page faults |
| MEMCpyW | MEMCOPYW | # of page protection faults on shared copy-on-write pages |
| MEMDFill | MEMDFILL | # of page faults due to demand |
| MEMFlush | MEMFLUSH | # single processor Translation Lookaside Buffer (TLB) flushes per sec |
| MEMFreeMem | MEMFREEM | # of 1 KB pages of memory available |
| MEMHeapMem | MEMHPMEM | # of 1-KB pages allocated to the system dynamic heap |
| MEMIdGet | MEMIDGET | # of new Translation Lookaside Buffer (TLB) IDs issued per second |
| MEMIdPrg | MEMIDPRG | # Translation Lookaside Buffer (TLB) IDs purged per sec/process |
| MEMIdWrp | MEMIDWRP | # flushes per sec caused by depleted (TLB) IDs |
| MEMLRead | MEMLREAD | Logical blocks read per sec from system buffer |
| MEMLWrt | MEMLWRT | # of writes per sec to system buffer |
| MEMOverHd | MEMOVRHD | Amount of memory overhead for heap block management |
| MEMPFault | MEMPFALT | # of detected page protection faults that caused pages to be copied |
| MEMPRead | MEMPREAD | # of raw reads per sec from char devices |
| MEMPWrt | MEMPWRT | # of raw writes per sec to char devices |
| MEMPageAnticipated | MEMPGANT | Anticipated short |
| MEMPageFreed | MEMPGFRD | # 1-KB mem pages added to free list by the page-stealing daemon |
| MEMPagein | MEMPGIN | # of 1 KB pages of memory swapped |
| MEMPageOut | MEMPGOUT | # of 1 KB pages of memory swapped |
| MEMPageScanned | MEMPSCND | # 1-KB mem pages scanned per sec by the page-stealing daemon |
| MEMPgFil | MEMPGFIL | # page faults reclaimed by bringing the pages in from the file system |
| MEMPgSwp | MEMPGSWP | # page faults reclaimed by bringing pages in from the swap space |
| MEMRCache | MEMRCACH | % of logical reads that are in the buffer cache |
| MEMRFault | MEMRFALT | # of page reference faults per second |
| MEMRegionsIn | MEMREGIN | # of 1-KB memory pages, or regions, that have been swapped in |
| MEMRegionsOut | MEMRGOUT | # of 1-KB memory pages, or regions, that have been swapped out |
| MEMReq | MEMREQ | # of memory allocation requests per second |
| MEMSteal | MEMSTEAL | # of page protection faults on unshared writable pages. |
| MEMSwpBf | MEMSWPBF | # of swap buffer calls per second |

FIG. 2B

| Patrol Parameter | ITSV Variable Name | Description |
|---|---|---|
| MEMSync | MEMSYNC | # Translation Lookaside Buffer (TLB) flushes per sec, all processors |
| MEMTFault | MEMTFALT | # of user page table faults or kernel virtual address translation faults |
| MEMUnused | MEMUNUSD | # of bytes of heap memory available for allocation |
| MEMVmPrg | MEMVMPRG | # individual (TLB) entries purged per sec |
| MEMWCache | MEMWCACH | % of logical blocks written in the buffer cache |
| MEMWire | MEMWIRE | Locked memory the # of 1 KB |
| MEMZero | MEMZERO | # of memory pages zero-filled on demand |
| NETCollisionPrc | NETCOLPC | Percent of output attempts made by the host |
| NETInErrPrc | NETIERRP | Percent of incoming data packets containing |
| NETOutErrPrc | NETOERRP | Percent of outgoing data packets containing |
| NETPacketsOut | NETPKTSO | Total # on outgoing packets within a |
| NETPacketsIn | NETPKTSI | Total # on incoming packets within a |
| NFSCBadCall | NFSCBADC | Percent of NFS client calls that failed since |
| NFSCCall | NFSCCALL | # of NFS client calls made since |
| NFSCCreate | NFSCCRTE | % of all NFS client calls made to create a new file |
| NFSCFsStat | NFSCFSST | % of all NFS client calls made to retrieve file attributes or files statistics |
| NFSCGetAttr | NFSCGATR | % of all NFS client calls that are requests to get file attributes |
| NFSCLink | NFSCLINK | % of all NFS client calls made to create hard links |
| NFSCLookUp | NFSCLKUP | % of all NFS client calls made to look up directory paths |
| NFSCMkDir | NFSCMKDR | % of all NFS client calls that are calls made to create directories |
| NFSCNclGet | NFSCNCLG | # times the client had to request a new client handle for an NFS call |
| NFSCNclSleep | NFSCNCLS | # times the kernel must wait to obtain client structure information |
| NFSCNull | NFSCNULL | % of NFS client calls that request no action other than acknowledgment |
| NFSCRead | NFSCREAD | % of all NFS client calls that are calls to read data from files |
| NFSCReadDir | NFSCRDDR | % of all NFS client calls made to read directories |
| NFSCReadLink | NFSCRDLK | % of NFS client calls made to read symbolic links |
| NFSCRemove | NFSCRMVE | % of all NFS client calls made to remove files |
| NFSCRename | NFSCRNME | % of all NFS client calls made to rename files |
| NFSCRmDir | NFSCRMDR | % of all NFS client calls made to remove directories |
| NFSCRpcBadCall | NFSCRBCL | # NFS client RPC calls |
| NFSCRpcBadXid | NFSCRBXI% | of client of all NFS server calls made to read symbolic links |
| NFSSRemove | NFSSRMVE | % of all NFS server calls made to remove files |
| NFSSRename | NFSSRNME | % of all NFS server calls made to rename files |
| NFSSRmDir | NFSSRMDR | % of all NFS server calls made to remove directories |
| NFSSRpcBadCall | NFSSRBCL | Percent of NFS RPC server requests rejected |
| NFSSRpcBadLen | NFSSRBLN | # of server RPC calls that are |
| NFSSRpcCall | NFSSRCAL | # of NFS server RPC calls since the |
| NFSSRpcNullRecv | NFSSNRCV | # of null RPC calls that the server received |
| NFSSRpcXdrCall | NFSSRXCL | # of NFS server RPC calls whose |
| NFSSSetAttr | NFSSSATR | % of all NFS server calls made to store file attributes |
| NFSSSymLink | NFSSSLNK | % of all NFS server calls made to create symbolic links |
| NFSSWrite | NFSSWRTE | % of all NFS server calls made to write files |
| PADeltaBetweenExecSecs | PADBEXSC | # of sec between executions. Value is the RUNQ_DELTA var |
| PAInternalError | PAINTERR | # of miscellaneous internal errors |
| PAOutstandingJobs | PAOUTSJB | # of currently exec jobs on the PATROL Agent & time started |
| PATotalErrors | PATOTERR | Total # of errors detected by the PATROL Agent |

FIG. 2C

| Patrol Parameter | ITSV Variable Name | Description |
|---|---|---|
| PAUserErrors | PAUSRERR | # of errors that have occurred in user-specified commands |
| PAWorkRateExecsMin | PAWKRATE | # of instruction exec performed per min by the PATROL Agent |
| PRNQLength | PRNQLNTH | # of print jobs waiting in the print queue |
| PROCAvgUsrProc | PRCAUSRP | Average # of processes per non root |
| PROCExec | PRCEXEC | # of exec system calls per second |
| PROCNoZombies | PRCNOZOM | Total # of zombie processes |
| PROCNumProcs | PRCNUMPR | Total # of active processes on the system |
| PROCProcWait | PRCWAIT | # of processes currently waiting for |
| PROCProcWaitInt | PRCPWTIN | # of processes in an interruptable wait state |
| PROCProcWaitUnint | PRCPWTUN | # of processes in an uninterruptable wait state |
| PROCTopProcs | PRCTOPPS | # of processes (up to a maximum of |
| PROCUserProcs | PRCUSERP | # of non root user processes |
| ProcNumProcs | PRCNUMP | # of active processes on the system |
| SMPContextSwitch | SMPCTXSW | # of CPU context switches |
| SMPCrossCalls | SMPCXCLS | # of interprocessor cross calls |
| SMPIdlePercent | SMPIDLPC | Percent of time CPU was idle |
| SMPIntThread | SMPINTTR | # of interrupts as threads, excluding clock interrupts |
| SMPInterrupts | SMPINTER | # of processor interrupts |
| SMPInvContSwitch | SMPINVCX | # of processor involuntary context switches |
| SMPMajorFaults | SMPMAJFT | # of major faults |
| SMPMinorFaults | SMPMINFT | # of minor faults |
| SMPRunQLen15Min | SMPRQ15M | Avg # of processes in CPU run queue during the last 15 minutes |
| SMPRunQLen1Min | SMPRQ1MN | Avg # of processes in CPU run queue during the last minute |
| SMPRunQLen5Min | SMPRQ5MN | Avg # of processes in CPU run queue during the last 5 minutes |
| SMPSpinMutex | SMPSPNMX | # of spins on mutexes, or locks not acquired on the first try |
| SMPSpinRdWr | SMPSPNRW | # of reader and writer locks not acquired on the first try |
| SMPSystemCalls | SMPSYSCL | # of system calls |
| SMPSystemPrcnt | SMPSYSPC | Amount of time spent on system activities |
| SMPThMigration | SMPTHMIG | # of thread migrations to another processor |
| SMPUserPercent | SMPUSRPC | Amount of time spent on user requested |
| SMPWaitPercent | SMPWTPCT | Amount of processor time spent waiting |
| SWPSwapFreeSpace | SWPSFRSP | Size of the available swap space |
| SWPSwapSize | SWPSIZE | Size of a particular swap area |
| SWPSwapUsedPercent | SWPUSDPC | % of swap space used for a particular swap area |
| SWPTotSwapFreeSpace | SWPTOTFR | Size of the free swap space |
| SWPTotSwapSize | SWPTOTSZ | Size of the entire swap space |
| SWPTotSwapUsedPercent | SWPTOTUP | % of the entire swap space that is in use |
| SWPnPageSizeAvail | SWPNPAVL | # of swap pages available on the |
| USRNoSession | USRNOSES | # of active nonroot user sessions currently on this machine |
| USRNoUser | USRNUMBR | # of unique users currently logged |

FIG. 2D

SYSTEM AND METHOD FOR COLLATING UNIX PERFORMANCE METRICS

TECHNICAL FIELD

This invention relates to system metrics analysis. More particularly, this invention relates to data mining of computer performance data.

BACKGROUND OF THE INVENTION

Companies that own and operate computers for data processing encounter a need for capacity planning of computing resources, so that they can efficiently and accurately plan the purchasing of new computing resources. Computing resources include CPUs, memory, disk storage, tape storage, access devices, operating systems, file systems, and many others. Capacity planning relies on the accurate forecasting of resource utilization. Forecasting, in turn, requires analysis of current and historical system performance metrics data. These metrics include CPU utilization, disk storage utilization, memory utilization, memory allocation, file system access, and many others.

There are several issues of concern with regard to capacity planning. It is important for companies to be able to determine points at which new hardware will become necessary to meet system requirements. It is also important for companies to be able to project scenarios for potential configuration changes including both hardware and software. Another issue of concern is the monitoring and analysis of performance problems.

To address these and other needs, data analysis/reporting tools for analyzing, reporting, and graphing system performance metrics for the purposes of capacity forecasting and planning are currently commercially available. However, due to the enormous number of performance metrics (over 500 for UNIX based systems), commercially available data analysis tools consume large amounts of computer system resources. Large databases are required to store performance metrics and as a result, the data analysis tools are inefficient.

Accordingly, there is a need for a tool that discriminates among performance metrics to select the most significant performance metrics for performing capacity planning and performance management.

SUMMARY OF THE INVENTION

A programmed digital processing apparatus is disclosed which executes a program of instructions to perform method steps for selecting forecasting performance metrics from among a plurality of performance metrics. The executed method steps include collecting performance metrics that relate to a node, e.g., a UNIX based midrange computer. The method also includes performing principal components and factor analysis on the performance metrics to identify one or more factors such that each performance metric is associated with a corresponding one of the factors. Further, the method includes, for each factor, selecting the performance metrics having a weight greater than a threshold figure in absolute value and storing the selected performance metrics in a database.

In accordance with different aspects of the invention, the factors may include system factors, disk factors, CPU factors, Swap factors, memory factors and process factors.

An advantage of the present invention is that it reduces system storage requirements by reducing the volume of performance metrics required to be archived in order to perform capacity planning.

Another advantage of the invention is that it codifies the major predictors of CPU consumption on UNIX based computers.

Still another advantage of the invention is that it provides a unique tool to allow analysts, performance engineers and/or system administrators to precisely identify the causes of various system conditions such as CPU consumption.

The details of the present invention, both as to its structure and operation, can best be understood with reference to the accompanying drawings, in which like reference numerals refer to like parts.

BRIEF DESCRIPTION OF THE DRAWINGS

FIGS. 2A through 2D depict UNIX performance metrics.

DETAILED DESCRIPTION OF THE EMBODIMENTS

Figure 1:
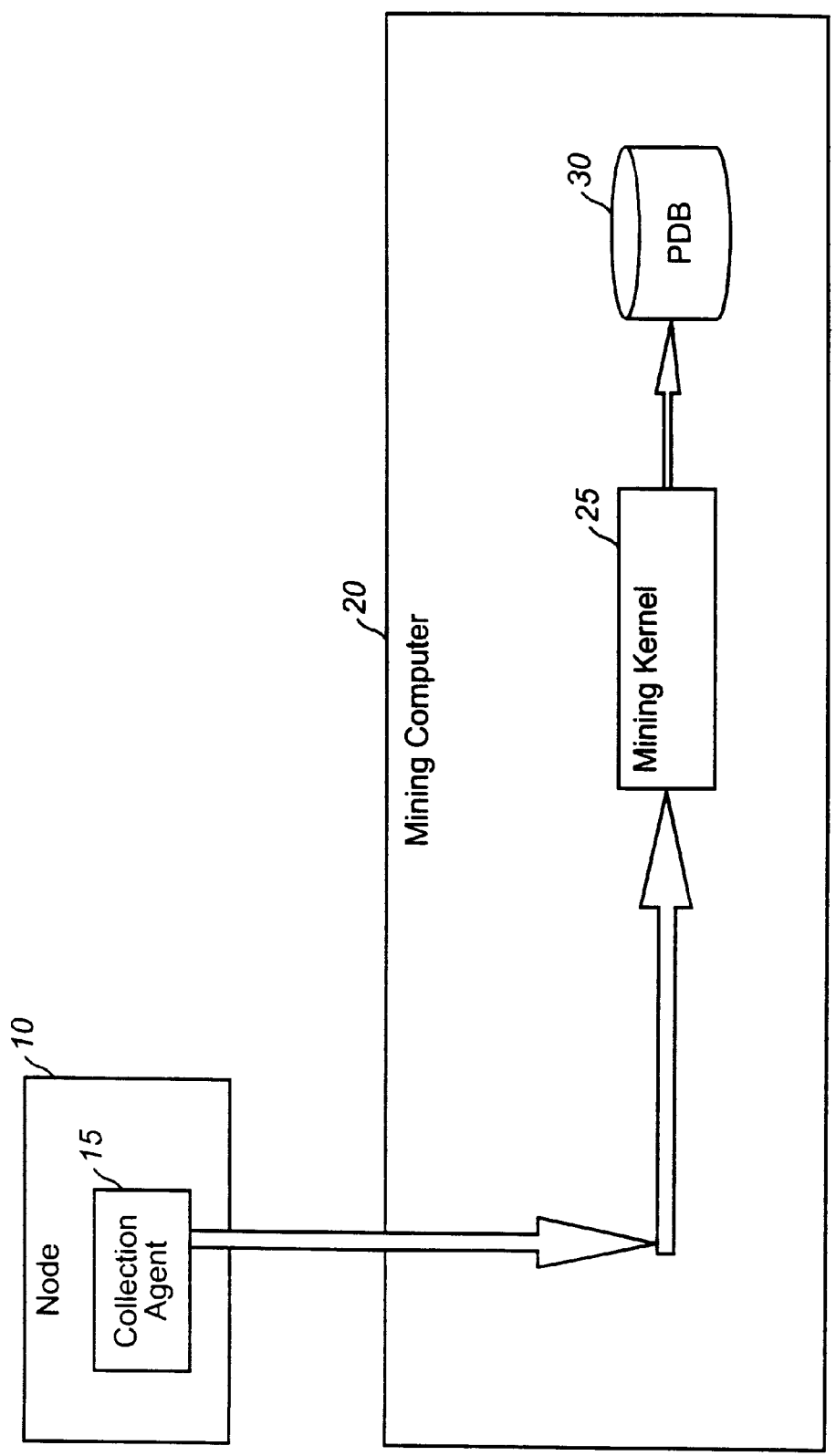
FIG. 1 is a functional block diagram of the system for the present invention.

Referring to FIG. 1, a system for mining performance metrics is shown. In the particular architecture shown, the system includes one or more nodes a 10 embodying performance metrics. Preferably, node 10 includes computers such as UNIX, Windows NT or PC based workstations. Each node 10 may include a proprietary collection agent 15 such as that described in U.S. patent application No. 09/031,965 which is hereby incorporated by reference. Collection agents 15 preferably collect performance metrics data from nodes 10. Exemplary performance metrics for UNIX systems are depicted in FIGS. 2A–2D.

In keeping with the invention, a digital processing apparatus such as a mining computer 20 may be coupled to node 10. Mining computer 20 preferably includes mining kernel 25 and performance database (PDB) 30. Mining kernel 25 preferably performs factor analysis on the performance metrics to correlate performance metrics with extracted factors and selects forecasting performance metrics defined as those metrics having a weight preferably greater than about 0.5, more preferably greater than about 0.6 and most preferably greater than about 0.65. Mining kernel 25 may be executed by a processor within mining computer 20 as a series of computer-executable instructions. These instructions may reside, for example, on a data storage medium such as the RAM of mining computer 20, a computer diskette, an optical storage device, a CD ROM, a conventional hard disk drive, magnetic tape, a DASD array or any other appropriate storage device. Through extensive trials and testing, the inventor has determined that performance metrics having a weight greater than 0.65 are performance metrics that have the most significant impact upon a given factor. Once selected, the forecasting performance metrics are preferably stored in the performance database 30. In the illustrated embodiment, PDB 30 is contained within mining computer 25. However, in accordance with the invention, PDB 30 may be disposed remotely from mining computer 25 in a remote database storage unit.

Identifying the forecasting performance metrics is a significant advance in field of resource utilization forecasting.

The forecasting performance metrics provide vital indicators as to resource utilization which facilitates fast and accurate capacity planning.

Figure 3:
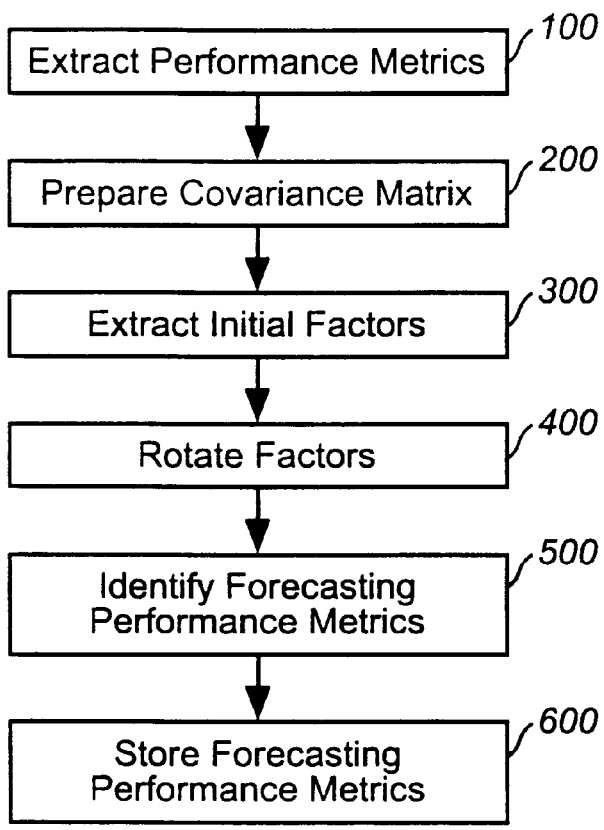
FIG. 3 is a flow chart illustrating a process of selecting forecasting performance metrics in accordance with the invention.

FIG. 3 illustrate the process performed by mining computer 20. In accordance with a preferred embodiment, performance metrics are input to mining kernel 25 and subject to a factor analysis process. While in the preferred embodiment the performance metrics include performance metrics relating to UNIX based systems, the invention is not so limited. The traditional factor analysis process is explained below.

Factor Analysis

Factor analysis is a generic term for a family of statistical techniques concerned with the reduction of a set of observable variables in terms of a small number of latent factors. It has been developed primarily for analyzing relationships among a number of measurable entities (such as survey items or test scores). The underlying assumption of factor analysis is that there exists a number of unobserved latent variables (or "factors") that account for the correlations among observed variables, such that if the latent variables are partialled out or held constant, the partial correlations among observed variables all become zero. In other words, the latent factors determine the values of the observed variables.

Each observed variable (y) can be expressed as a weighted composite of a set of latent variables (f's) such that $$y_i = a_{i1}f_1 + a_{i2}f_2 + \ldots + a_{ik}f_k + e_i$$

where $y\_i$ is the iith observed variable on the factors, and $e\_i$ is the residual of $y\_i$ on the factors. Given the assumption that the residuals are uncorrelated across the observed variables, the correlations among the observed variables are accounted for by the factors.

Figure 4:
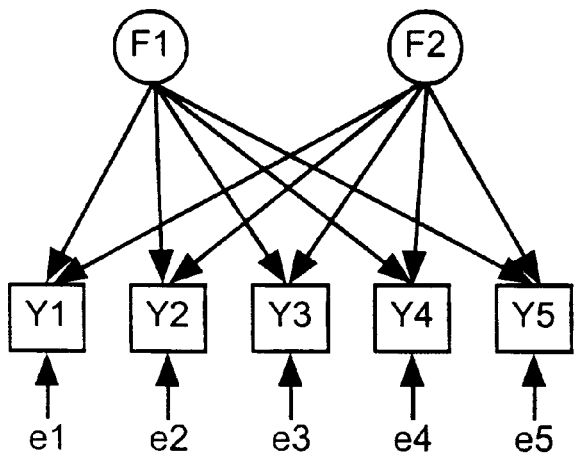
FIG. 4 is a path diagram for a factor analysis model.

FIG. 4 is an example of a simple path diagram for a factor analysis model and a schematic representation of the above formula. F1 and F2 are two common factors. Y1, Y2, Y3, Y4, and Y5 are observed variables, possibly 5 subtests or measures of other observations such as responses to items on a survey. e1, e2, e3, e4, and e5 represent residuals or unique factors, which are assumed to be uncorrelated with each other. Any correlation between a pair of the observed variables can be explained in terms of their relationships with the latent variables.

A. Common Factor Analysis vs. Component Analysis

Factor analysis as a generic term includes principal component analysis. While the two techniques are functionally very similar and are used for the same purpose (data reduction), they are quite different in terms of underlying assumptions.

The term "common" in common factor analysis describes the variance that is analyzed. It is assumed that the variance of a single variable can be decomposed into common variance that is shared by other variables included in the model, and unique variance that is unique to a particular variable and includes the error component. Common factor analysis (CFA) analyzes only the common variance of the observed variables; principal component analysis considers the total variance and makes no distinction between common and unique variance. Common factor analysis and principal component analysis are similar in the sense that the purpose of both is to reduce the original variables into fewer composite variables, called factors or principal components.

However, they are distinct in the sense that the obtained composite variables serve different purposes. In common factor analysis, a small number of factors are extracted to account for the intercorrelations among the observed variables—to identify the latent dimensions that explain why the variables are correlated with each other. In principal component analysis, the objective is to account for the maximum portion of the variance present in the original set of variables with a minimum number of composite variables called principal components.

There are several commercially available software packages for performing factor analysis including STATISTICA available from Statsoft of 2300 East $14^{th}$ Street, Tulsa Okla. and SPSS available from SPSS, Inc. of 233 S. Wacker Drive, Chicago, Ill. 60606-6307. The following discussion focuses on the factor analysis procedure employed by SAS Institute' Statistics Modules.

2. Selecting a Factor Model

Once the input data are prepared for the analysis, it is necessary to decide on a factoring technique, that is, a method of extracting factors. In particular, a decision must be made as to whether to perform factor analysis or principal components analysis. Many commercial software packages for performing factor analysis have a procedure specifically designed for principal component analysis. In the SAS program includes a routine specifically designed for principal components analysis (PROC PRINCOM), which is defined by its unique extraction method. However, if factor analysis is employed, then you must choose an extraction technique. The SAS software package, for example, includes a variety of different methods of factor extraction such as: principal component, principal factor, iterative principal factor, unweighted least-squares factor, maximum-likelihood factor, alpha factor, image analysis, and Harris component analysis. The two most commonly employed factor analytic techniques are principal component and principal factor analysis. As discussed above, PCA is quite different from FA. For additional information on extraction of factors see Latent Variable Models by J. C. Loehlin, published by Erlbaum Associates, Hillsdale, N.J.

3. Estimating Communalities

As mentioned earlier, in principal components analysis we do not make a distinction between common and unique parts of the variation present in a variable. The correlation (covariance) matrix, with 1.0s (variances) down the main diagonal, is submitted to an analysis. On the other hand, a common factor analysis begins by substituting the diagonal of the correlation matrix with what are called prior communality estimates (h2). The communality estimate for a variable is the estimate of the proportion of the variance of the variable that is both error free and shared with other variables in the matrix. Since the concept of common variance is hypothetical, we never know exactly in advance what proportion of the variance is common and what proportion is unique among variables. Therefore, estimates of communalities need to be supplied for a factor analysis. A simple approach is to use the largest absolute correlation for a variable with any other variable as the communality estimate for the variable. A more sophisticated approach is to use the squared multiple correlation (R2) between the variable and all other variables. As the number of variables increases, the importance of accurate prior estimates decreases.

4. Determining the Number of Factors

Determining the optimal number of factors to extract is not a straightforward task since the decision is ultimately subjective. There are several criteria for the number of factors to be extracted, but these are just empirical guidelines rather than an exact quantitative solution. In practice, most factor analysts seldom use a single criterion to decide on the number of factors to extract. Some of the most commonly used guidelines are the Kaiser-Guttman rule, percentage of variance, the scree test, size of the residuals, and interpretability.

Kaiser-Guttman Rule

The "eigenvalues greater than one" rule has been most commonly used due to its simple nature and availability in various computer packages. It states that the number of factors to be extracted should be equal to the number of factors having an eigenvalue (variance) greater than 1.0. The rationale for choosing this particular value is that a factor must have variance at least as large as that of a single standardized original variable. Recall that in principal components analysis 1's are retained in the main diagonal of the correlation matrix, therefore for p standardized variables there is a total variance of p to be decomposed into factors. This rule, however, is more appropriate for PCA than FA, and it should be adjusted downward when the common factor model is chosen. In a common factor analysis, communality estimates are inserted in the main diagonal of the correlation matrix. Therefore, for p variables the variance to be decomposed into factors is less than p. It has been suggested that the latent root (eigenvalue) criterion should be lower and around the average of the initial communality estimates.

Percentage of Variance

Another criterion, related to the latent root criterion, is the percentage or proportion of the common variance (defined by the sum of communality estimates) that is explained by successive factors. For example, if you set the cutting line at 75 percent of the common variance, then factors will be extracted until the sum of eigenvalues for the retained factors exceeds 75 percent of the common variance, defined as the sum of initial communality estimates.

Scree Test

Figure 5:
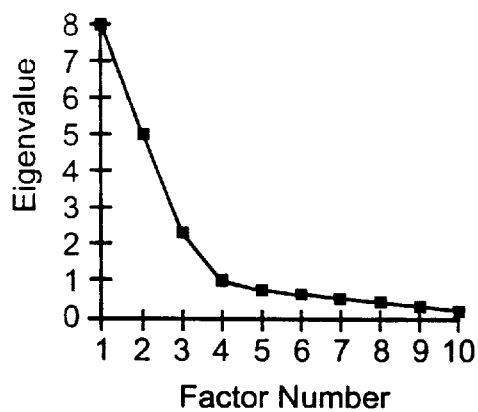
FIG. 5 shows a Scree Plot.

Sometimes plotting the eigenvalues against the corresponding factor numbers gives insight into the maximum number of factors to extract. The SCREE option in the PROC FACTOR statement produces a scree plot that illustrates the rate of change in the magnitude of the eigenvalues for the factors. The rate of decline tends to be fast for the first few factors but then levels off. The "elbow", or the point at which the curve bends, is considered to indicate the maximum number of factors to extract. The figure below illustrates an example of a rather idealistic scree plot, where a clear elbow occurred at the fourth factor, which has an eigenvalue right around 1. Notice that the eigenvalues for the first few variables drop rapidly and after the fourth factor the decline in the eigenvalues gradually levels off. The scree plot suggests a maximum of four factors in this example. One less factor than the number at the elbow might be appropriate if you are concerned about getting an overly defined solution. However, many scree plots do not give such a clear indication of the number of factors. See FIG. 5.

Analysis of Residuals

If the factors are doing a good job in explaining the correlations among the original variables, we expect the predicted correlation matrix R* to closely approximate the input correlation matrix. In other words, we expect the residual matrix R—R* to approximate a null matrix. The RESIDUAL (or RES) option in the PROC FACTOR statement prints the residual correlation matrix and the partial correlation matrix (correlation between variables after the factors are partialled out or statistically controlled). If the residual correlations or partial correlations are relatively large (>0.1), then either the factors are not doing a good job explaining the data or it may be necessary to extract more factors to more closely explain the correlations. If maximum likelihood factors (METHOD=ML) are extracted, then the output includes the Chi-square test for the significance of residuals after the extraction of the given factor. This test comprises two separate hypothesis tests. The first test, labeled, "Test of H0: No common factors" tests the null hypothesis that no common factors can sufficiently explain the intercorrelations among the variables included in the analysis. It is desirable for this test to be statistically significant (p<0.05). A nonsignificant value for this test statistic suggests that the intercorrelations may not be strong enough to warrant performing a factor analysis since the results from such an analysis could probably not be replicated.

The second Chi-square test statistic, labeled "Test of H0: N factors are sufficient" or test of the null hypothesis is the test of the hypothesis that N common factors are sufficient to explain the intercorrelations among the variables, where N is the number of factors you specify with an NFACTORS=N option in the PROC FACTOR statement. This test is useful for testing the hypothesis that a given number of factors are sufficient to account for your data; in this instance your goal is a small chi-square value relative to its degrees of freedom. This outcome results in a large p-value (p>0.05). One downside of this test is that the Chi-square test is very sensitive to sample size: given large degrees of freedom, this test will normally reject the null hypothesis of the residual matrix being a null matrix, even when the factor analysis solution is very good. Therefore, one should be careful and rigorous in interpreting this test's significance value. Some data sets do not lend themselves to good factor solutions, regardless of the number of factors extracted.

Interpretability

Another very important but often-overlooked criterion for determining the number of factors is the interpretability of the factors extracted. Factor solutions should be evaluated not only according to empirical criteria but also according to the criterion of "theoretical meaningfulness." Extracting more factors will guarantee that the residual correlations get smaller and thus that the chi-square values get smaller relative to the number of degrees of freedom. However, noninterpretable factors may have little utility. That is, an interpretable three-factor solution may be more useful (not to mention more parsimonious) than a less interpretable four-factor solution with a better goodness-of-fit statistic.

A Priori Hypotheses

The problem of determining the number of factors is not a concern if the researcher has an a priori hypothesis about the number of factors to extract. That is, an a priori hypothesis can provide a criterion for the number of factors to be extracted. If a theory or previous research suggests a certain number of factors and the analyst wants to confirm the hypothesis or replicate the previous study, then a factor analysis with the prespecified number of factors can be run. Ultimately, the criterion for determining the number of factors should be the replicability of the solution. It is important to extract only factors that can be expected to replicate themselves when a new sample of subjects is employed.

5. The Rotation of Factors

Figure 6:
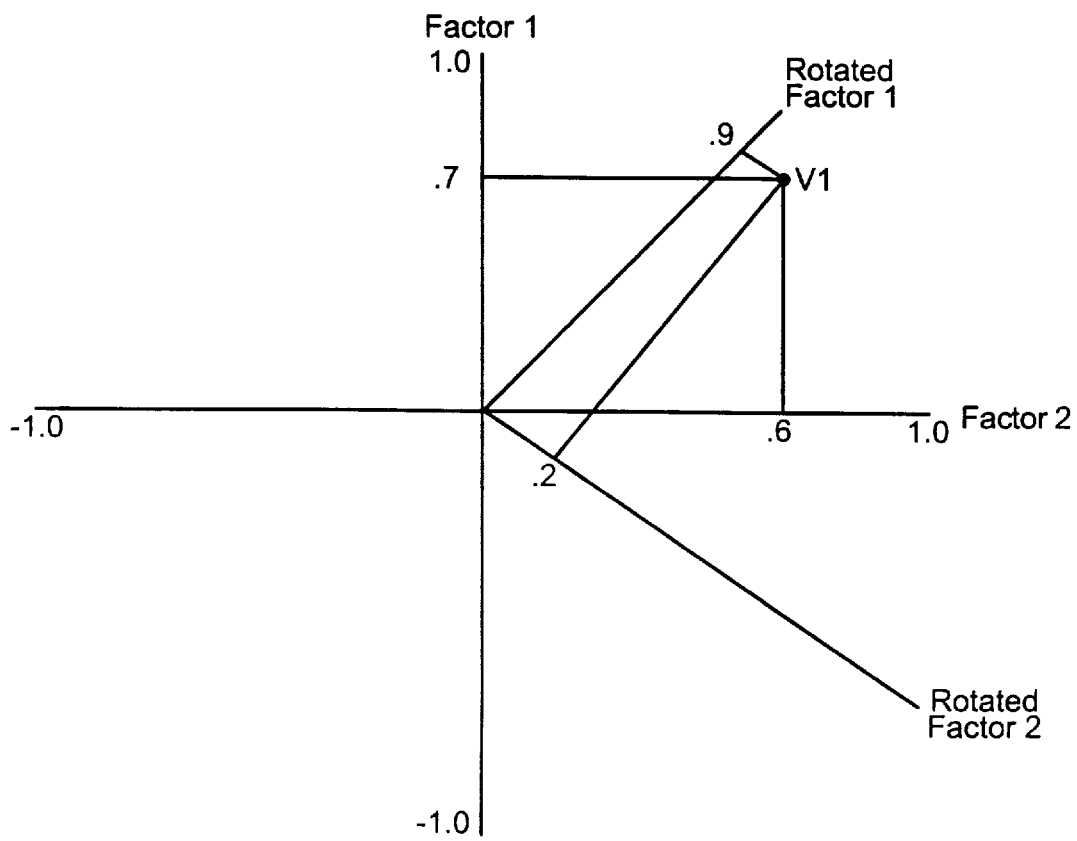
FIG. 6 depicts a graph illustrating factor rotation.

Once a decision is made relative to the number of factors to extract, the next logical step is to determine the method of rotation. The fundamental theorem of factor analysis is invariant within rotations. That is, the initial factor pattern matrix is not unique. It is possible to obtain an infinite number of solutions, which produce the same correlation matrix, by rotating the reference axes of the factor solution to simplify the factor structure and to achieve a more meaningful and interpretable solution. The idea of simple structure has provided the most common basis for rotation, the goal being to rotate the factors simultaneously so as to have as many zero loadings on each factor as possible. The FIG. 6 is a simplified example of rotation, showing only one variable from a set of several variables. The variable V1 initially has factor loadings (correlations) of 0.7 and 0.6 on factor 1 and factor 2 respectively. However, after rotation the factor loadings have changed to 0.9 and 0.2 on the rotated factor 1 and factor 2 respectively, which is closer to a simple structure and easier to interpret.

The simplest case of rotation is an orthogonal rotation in which the angle between the reference axes of factors are maintained at 90 degrees. More complicated forms of rotation allow the angle between the reference axes to be other than a right angle, i.e., factors are allowed to be correlated with each other. These types of rotational procedures are referred to as oblique rotations. Orthogonal rotation procedures are more commonly used than oblique rotation procedures. In some situations, theory may mandate that underlying latent constructs be uncorrelated with each other, and therefore oblique rotation procedures will not be appropriate. In other situations where the correlations between the underlying constructs are not assumed to be zero, oblique rotation procedures may yield simpler and more interpretable factor patterns.

A number of orthogonal and oblique rotation procedures have been proposed. Each procedure has a slightly different simplicity function to be maximized. Five common orthogonal rotation methods are: EQUAMAX, ORTHOMAX, QUARTIMAX, PARSIMAX, and VARIMAX; and two common oblique rotation methods: PROCRUSTES and PROMAX. The VARIMAX method has been a particularly popular and robust orthogonal rotation procedure.

6. Interpretation of Factors

One part of the output from a factor analysis is a matrix of factor loadings. A factor loading or factor structure matrix is a n by m matrix of correlations between the original variables and their factors, where n is the number of variables and m is the number of retained factors. When an oblique rotation method is performed, the output also includes a factor pattern matrix, which is a matrix of standardized regression coefficients for each of the original variables on the rotated factors. The meaning of the rotated factors are inferred from the variables significantly loaded on their factors. A decision needs to be made regarding what constitutes a significant loading. A rule of thumb frequently used is that factor loadings greater than 0.30 in absolute value are considered to be significant. This criterion is just a guideline and may need to be adjusted. As the sample size and the number of variables increase, the criterion may need to be adjusted slightly downward; it may need to be adjusted upward as the number of factors increases. The procedure described next outlines the steps of interpreting a factor matrix.

A. Identifying significant loadings: The analyst starts with the first variable (row) and examines the factor loadings horizontally from left to right, underlining them if they are significant. This process is repeated for all the other variables.

Ideally, we expect a single significant loading for each variable on only one factor: across each row there is only one underlined factor loading. It is not uncommon, however, to observe split loadings, a variable which has multiple significant loadings. On the other hand, if there are variables that fail to load significantly on any factor, then the analyst should critically evaluate these variables and consider deriving a new factor solution after eliminating them.

B. Naming of Factors: Once all significant loadings are identified, the analyst attempts to assign some meaning to the factors based on the patterns of the factor loadings. To do this, the analyst examines the significant loadings for each factor (column). In general, the larger the absolute size of the factor loading for a variable, the more important the variable is in interpreting the factor. The sign of the loadings also needs to be considered in labeling the factors. It may be important to reverse the interpretation of negatively scoring items to prevent ambiguity. That is, some items may be negatively scored so that high scores on these items actually reflect an inverse relationship with the construct being measured. Remember that the factor loadings represent the correlation or linear association between a variable and the latent factor(s). Considering all the variables' loading on a factor, including the size and sign of the loading, the investigator makes a determination as to what the underlying factor may represent.

7. Estimating Factor Scores

A factor is a latent continuum along which we can locate data points according to the varying amount of the construct that they possess. The FACTOR procedure can provide the estimated scoring coefficients which are then used in PROC SCORE to produce a matrix of estimated factor scores. These scores may then be output into, for example, an SAS dataset for further analysis.

Figure 7:
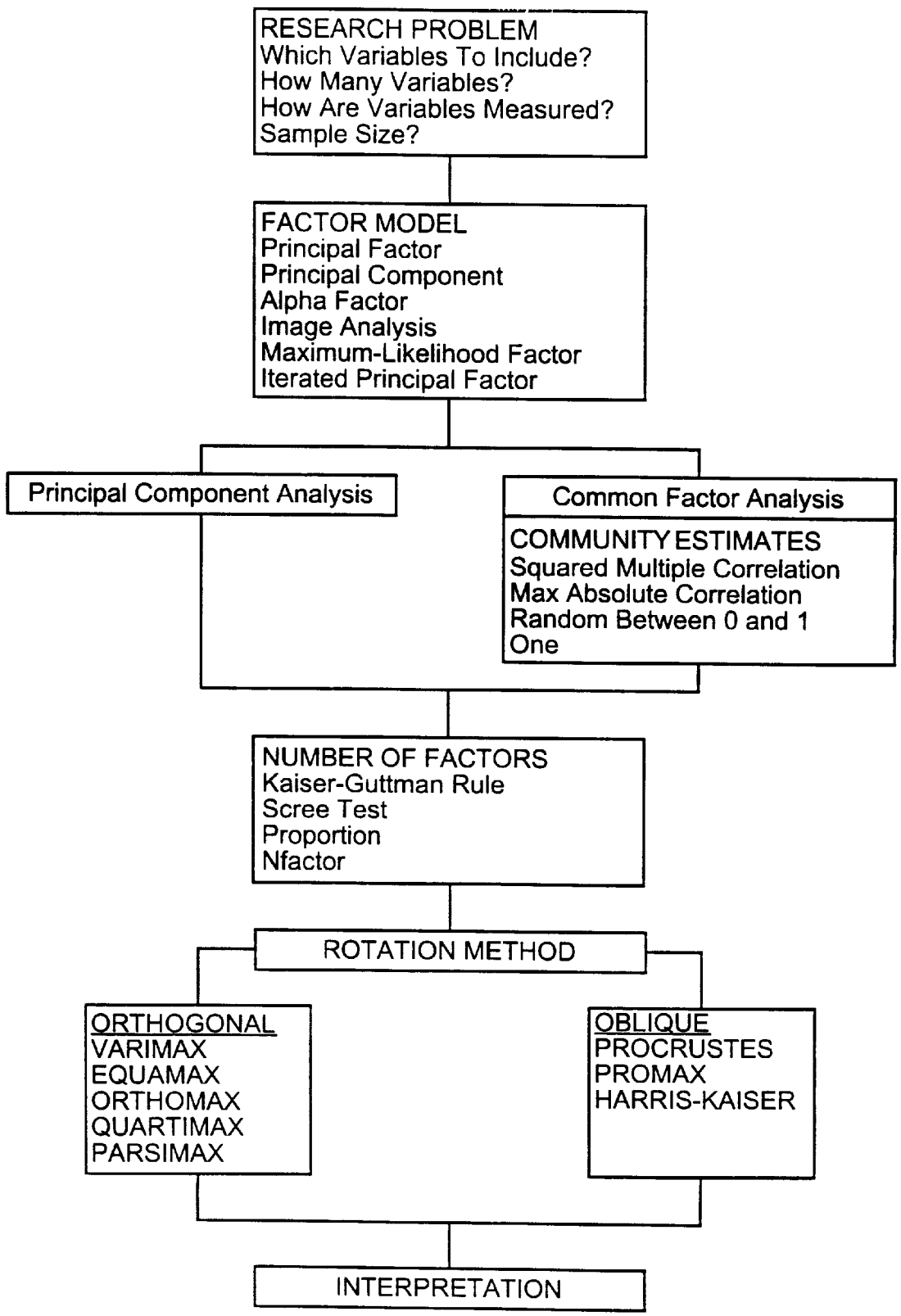
FIG. 7 shows a factor analysis decision diagram.

FIG. 7 illustrates an exemplary decision process for factor analysis. This decision process is described here as a linear flow of events for the sake of simplicity. However, it would be more realistic to have a number of feedback loops included in the diagram. That is, depending on the result at a given stage, any previously made decision may need to be modified.

Turning again to FIG. 3, a preferred process of operation for mining computer 20 is illustrated. At block, 100 performance metrics may be extracted from node 10, preferably in the form of a data matrix, using any known collection agent. To illustrate, a set of Objects represented by $O_1, O_2 \ldots O_3$ are measured with respect to the number of variables $v_1, v_2 \ldots v_3$ (i.e. O×v matrix). This O x v input data matrix represents the actual quantitative measures of performance of the individual metering records (i.e. the variables) on the number of individual date time stamps (i.e. the objects). The performance measures are the actual metering records obtained from one's data collector of choice. For example, in accordance with an exemplary embodiment, a BMC Software of Houston, Texas' Best/1® data collector samples the performance of approximately 500 dimensions of Unix system performance every 10 seconds, and outputs or "spills" an individual metering record every 15 minutes for each dimension. This record is the arithmetic mean of each 15-minute interval for each dimension. The number of possible combinations for the O×v data matrix can be extremely large. Algebraically, for a matrix of "X" date time stamps by 500 metrics, the number of unique combinations will be 500X where "X" equals the number of data time stamps in the data set. In order to insure that the results of the factor analysis are statistically reliable, the size of the sample of objects should be minimally equal to the square of the number of variables.

At block 200, a correlation matrix may be built using the metrics from the input data matrix. The correlation matrix preferably involves the systematic arrangement of all correlation coefficients that exist between each pair of variables. For example, a correlation may be calculated for each combination of two variables (i.e. $v_1$, with $v_2$, $v_1$, with $v_3$, etc.). Also $v_2$, with $v_3$, $v_2$, with $v_4$ until a correlation coefficient may be calculated for each possible pair of variables. Alternatively, a standard covariance matrix may be built at block 200. The decision relative to whether to use the correlation or covariance matrices during this step depends on:
(1) whether the variables have comparable metrics,
(2) the type of extraction method used (i.e. maximum likelihood, least squares, Alpha factoring, image analysis et al),
(3) whether one is comparing one factor structure to another.

From a practical perspective it does not matter which matrix is used when the research objective is to measure the relevant underlying dimensions in the data.

After the covariance matrix has been built, the initial factors may be extracted as shown at block 300. These factors may include, e.g., system factors, CPU factors, Swap factors, memory factors, disk factors and process factors. A primary objective of the extraction step is to determine the minimum number of common factors that would satisfactorily produce correlation among the observed variables. If there are no measurement and/or sampling error then there should be an exact correspondence between the minimum number of common factors responsible for a given correlation matrix and the rank of the adjusted correlation matrix. If there is no sampling error and there is an exact fit between the factorial model and the data, the actual communality values, as well as the number of common factors, can be determined by examining the rank of the adjusted correlation matrix (e.g. adjustment of the correlation matrix requires insertion of the communalities in the main diagonal). The factor matrix is the output of a matrix algebra transformation of the correlation/covariance matrix. The following citations do an excellent job of documenting and graphically portraying the mathematical calculations and algorithms necessary to perform matrix transformations: Harman, H. H, (1976), *Modern Factor Analysis,* 3d Edition, Chicago: University of Chicago Press. Mulaik, S. A, (1972), *The Foundations of Factor Analysis, New York:* McGraw-Hill Book Co.

In the factor matrix, the columns represent the derived factors, and the rows represent the original input variables. The cell entries of the factor matrix (i.e. the factor loadings) represent the degree to which each of the variables correlates with each of the factors and are nothing more than the correlation coefficients between the original variables and the derived factors, which are themselves variables. Therefore, the salient statistical problem encountered relative to extraction involves finding criteria that will provide insight into when to stop extracting common factors; which in turn, involves determining when the discrepancy between the reproduced correlations and the observed correlations can be attributed to sampling variability.

The extraction strategy common to most methods involves hypothesizing a minimum number of common factors necessary to reproduce the observed correlations and evaluating that hypothesis by applying some criterion to determine whether the discrepancy between the assumed model and the data is trivial. (i.e. extracting those factors that account for "most" of the observed covariation). Extraction methods considered/tested included:
(1) maximum likelihood,
(2) least squares,
(3) least squares with principal axis factoring with iterated communalities,
(4) Alpha factoring,
(5) Image analysis, and
(6) Principal components analysis In accordance with a preferred embodiment of the invention, principal component analysis was the extraction method employed in the present factor model. Principal components analysis is a method for transforming a given set of observed variables into another set of variables by determining the principal axis required to minimize the perpendicular distance between the data points and the axis (i.e. from that point perpendicular to the principal axis). The eigenequation is the mathematical construct used to calculate these transformations. Solving this equation produces eigenvalues and eigenvectors associated with a matrix. As a general rule individual data points will tend to cluster such that higher values of "X" will be associated with high values of "Y" (and vice versa) such that the principal axis will tend to run along that line on which the most data points are located. If one were to represent this scenario using a quadratic graph, the data points would tend to cluster along the first and third quadrants verses the second and fourth. In matrix notation, the characteristic equation has the following form:

$$RV=\lambda V$$

where:
R=the matrix for which the solution is required
V=the eigenvector to be found
$\lambda$=an eigenvalue or
In simplified terms the solution is eventually based on a determinant equation of the form:

$$Det(R-1\lambda)=0,$$

which translates into a simple bivariate matrix $$Det\begin{pmatrix} 1-\lambda & r_{12} \\ r_{12} & 1-\lambda \end{pmatrix} = 0$$

which can be reduced to $$(1-\lambda)(1-\lambda)-r_{12}(r_{12})=0$$

(by definition of determinant)

$$=(1-\lambda)-2\lambda)+(r^2_{12})=0$$

(by expanding and grouping in standard form)
The eigenvalues for a bivariate correlation matrix are:

$$\lambda_1=1+r_{12},$$

and $$\lambda_1=1-r_{12}$$

This illustrates that the correlation between the two variables is extremely high; one of the eigenvalues will be 2 and the other zero, and if the correlation is zero, both eigenvalues will be 1. Also the sum of the eigenvalues, $\lambda_1+\lambda_2=(1+r_{12})+(1-r_{12})=2$, is equivalent to the number of variables and the product, $(\lambda_1)(\lambda_2)=(1-r^2_{12})$, is equivalent to the determinant or the correlation matrix. These properties hold for correlation matrices of any size. From a utilitarian perspective, however, is the fact that the largest eigenvalue represents the amount of variance explained by the first principal axis, the second largest eigenvalue represents the amount of variance explained by the second axis etc. Eigenvalues are interpreted as a statistic that corresponds to the equivalent number of variables, which the factor represents. For example, an eigenvalue of 4.75 indicates that the factor accounts for as much variance in the data set as approximately 4.75 variables. Since the sum of all eigenvalues is equal to the number of variables in the analysis (when the correlation matrix is used), by dividing the first eigenvalue by the N (number of variables), one can obtain the proportion of the variance explained by a given axis or component:

proportion explained by a given component=(corresponding eigenvalue)/$N$

The associated eigenvectors are found by imposing an arbitrary constraint that their lengths be 1. This enables generation of the principal component loadings by multiplying the eigenvectors by the square roots of the respective eigenvalues. This calculation allows one to correctly reflect the relative amount of variance explained by the actual data.

At block 400 the extracted factors may be rotated to form terminal solutions. More particularly, the performance metrics may be reduced or grouped into mathematical centroids.

At block 500, the forecasting performance metrics may be identified. For each factor, the forecasting performance metrics are those metrics preferably having a weight greater than about 0.4 in absolute value, more preferably having a weight greater than about 0.5 in absolute value and most preferably having a weight greater than about 0.65 in absolute value.

At block 600, the forecasting performance metrics are stored in PDB 30. By storing only the forecasting performance metrics, the necessary tools to perform capacity planning are collected in a single location. In addition, considerable storage space is saved by storing only the forecasting performance metrics as the forecasting performance metrics are typically less than about 70% of the total performance. Still another benefit of identifying the forecasting performance metrics is that it reduces that data processing burden on the capacity planning system by several orders of magnitude.

While several variations of the present invention have been described, it should be understood that they have been presented by way of example only, and not limitation. While the present invention is particularly suited to select forecasting performance metrics for, e.g., CPU factors, it is not limited to this function. The invention may be used to select forecasting performance metrics for any of a number of factors. Such forecasting performance metrics are invaluable in performing capacity planning calculations. Thus, the breadth and scope of the present invention should not be limited by any of the above-described exemplary embodiments, but should be defined only in accordance with the following claims and their equivalents.

We claim:

1. A method for selecting forecasting performance metrics from among a plurality of performance metrics:

collecting a plurality of performance metrics relating to a node;

performing factor analysis on the plurality performance metrics to identify one or more factors such that such that each performance metric is associated with a corresponding one of the one or more factors;

for each of the one or more factors, selecting the performance metrics having a weight greater than about 0.4 in absolute value, said selected performance metrics being forecasting performance metrics; and storing the forecasting performance metrics in a database.

2. The method of claim 1 wherein the one or more factors include system factors.

3. The method of claim 1 wherein the one or more factors include disk factors.

4. The method of claim 1 wherein the one or more factors include CPU factors.

5. The method of claim 1 wherein the one or more factors include Swap factors.

6. The method of claim 1 wherein the one or more factors include memory factors.

7. The method of claim 1 wherein the one or more factors include process factors.

8. The method of claim 1 wherein the step of selecting the performance metrics includes selecting the performance metrics having a weight greater than about 0.5 in absolute value.

9. The method of claim 8 wherein the step of selecting the performance metrics includes selecting the performance metrics having a weight greater than about 0.65 in absolute value.

10. The method of claim 1 wherein the node includes a UNIX computer.

11. An apparatus for selecting forecasting performance metrics from among a plurality of performance metrics comprising:

a data processor programmed to:
receive a plurality of performance metrics relating to a node;
perform factor analysis on the plurality of performance metrics to identify one or more factors such that each performance metric is associated with a corresponding one of the one or more factors;
for each of the one or more factors, select the performance metrics having a weight greater than about 0.6 in absolute value, said selected performance metrics being forecasting performance metrics; and a storage device that stores the forecasting performance metrics in a performance database.

12. The apparatus of claim 11 wherein the one or more factors include system factors.

13. The apparatus of claim 11 wherein the one or more factors include disk factors.

14. The apparatus of claim 11 wherein the one or more factors include CPU factors.

15. The apparatus of claim 11 wherein the one or more factors include Swap factors.

16. The apparatus of claim 11 wherein the one or more factors include memory factors.

17. The apparatus of claim 11 wherein the one or more factors include process factors.

18. The apparatus of claim 11 wherein said data processor is programmed to select the performance metrics includes selecting the performance metrics having a weight greater than about 0.5 in absolute value.

19. The apparatus of claim 18 wherein is programmed to select the performance metrics having a weight greater than about 0.65 in absolute value.

20. The apparatus of claim 1 wherein the node includes a UNIX based computer.

* * * * *